United States Patent [19]

Minahara et al.

[11] Patent Number: 5,131,962
[45] Date of Patent: Jul. 21, 1992

[54] LOW-RESIDUAL TYPE SOLDERING FLUX

[75] Inventors: Hatsuhiro Minahara, Takatsuki; Noriko Ikuta, Kobe, both of Japan

[73] Assignee: MEC Co., Ltd., Hyogo, Japan

[21] Appl. No.: 719,504

[22] Filed: Jun. 24, 1991

[30] Foreign Application Priority Data

Oct. 3, 1990 [JP] Japan .................................. 2-263767

[51] Int. Cl.⁵ .......................................... B23K 35/34
[52] U.S. Cl. .................................... 148/23; 148/24; 148/25
[58] Field of Search ................................ 148/23-25

[56] References Cited

U.S. PATENT DOCUMENTS

| | | | |
|---|---|---|---|
| 2,493,372 | 1/1950 | Williams | 148/25 |
| 2,927,049 | 3/1960 | Wasserman | 148/25 |
| 4,092,182 | 5/1978 | Arbib | 148/24 |
| 4,180,419 | 12/1979 | Thompson | 148/23 |
| 4,243,440 | 1/1981 | Arbib | 148/23 |
| 4,342,607 | 8/1982 | Zado | 148/25 |
| 5,004,509 | 2/1991 | Bristol | 148/25 |

Primary Examiner—Peter D. Rosenberg
Attorney, Agent, or Firm—Oliff & Berridge

[57] ABSTRACT

A soldering flux includes at least one acid component and at least one ester component. The acid component is selected from among dibasic carboxylic acid, hydroxycarboxylic acid and keto carboxylic acid. The ester component is selected from among phosphoric ester, phosphorous ester and hypophosphite ester.

3 Claims, 1 Drawing Sheet

Pass (good soldering)

Failure (poor soldering)

LOW-RESIDUAL TYPE SOLDERING FLUX

BACKGROUND OF THE INVENTION

1. Field of the Invention

The present invention relates to a soldering flux, and more particularly to a flux of low-residual type which leaves substantially no residue after soldering, thereby requiring no subsequent washing process.

2. Description of the Backcround Art

In the washing process of printed-circuit boards after soldering, chlorofluorocarbon solvents (hereinafter referred to as CFCs) are most widely used in the industry at present. Volumetric regulation on the use of CFCs is now being placed on account of environmental problems such as ozone layer destruction, and in the near future, the use of CFCs will be totally restricted. Under these circumstances, the soldering flux of this invention, which leaves substantially no residue after soldering, can serve for eliminating the washing process to comply with the CFCs regulation. Furthermore, it can assure a more perfect detection of poor soldering by the in-circuit testing after soldering without any difficulties.

Conventional soldering fluxes consisting of natural resin such as rosin and the like or synthetic resin in conjunction with a few kinds of hydrohalogenated amine salts or certain organic acids are well known in the art. However, such fluxes inevitably leave a significant amount of residue on the surface of printed-circuit boards after soldering because they contain a large amount of resin as its essential component. Consequently, they cannot be used without subsequent washing process for the in-circuit testing. Further, the use of CFCs as a washing solvent encounters a strict regulation in connection with environmental problems and becomes more difficult to use in the industry.

Soldering fluxes of low-residual type are being sold by several manufacturers and available on the market. Nevertheless, their flux activities are inferior to those of conventional rosin type because those fluxes are subdued in their solderability to avoid the corrosion problem and/or deterioration in electric resistance. In this respect, such kind of fluxes can never be applicable to the recent surface-mount processes. Particularly, sufficient soldering may not be expected on the deteriorated copper surfaces subjected to thermal shock during the reflow soldering or on the solder-coated surface.

SUMMARY OF THE INVENTION

Accordingly, an object of the present invention is to provide a soldering flux which exhibits superior flux activities and yet leaves substantially no residue after soldering, and does not necessitate the subsequent washing process to comply with the CFCs regulation, and is capable of successfully carrying out the in-circuit testing without prewashing.

The flux of this invention comprises at least one acid component selected from the group consisting of dibasic carboxylic acid, hydroxy-carboxylic acid and ketocarboxylic acid, and at least one ester component selected from the group consisting of phosphoric ester, phosphorous ester and hypophosphite ester.

Other objects, features, and advantages of this invention will appear more fully from the following description.

DETAILED DESCRIPTION OF THE INVENTION AND PREFERRED EMBODIMENTS

Figure 1:
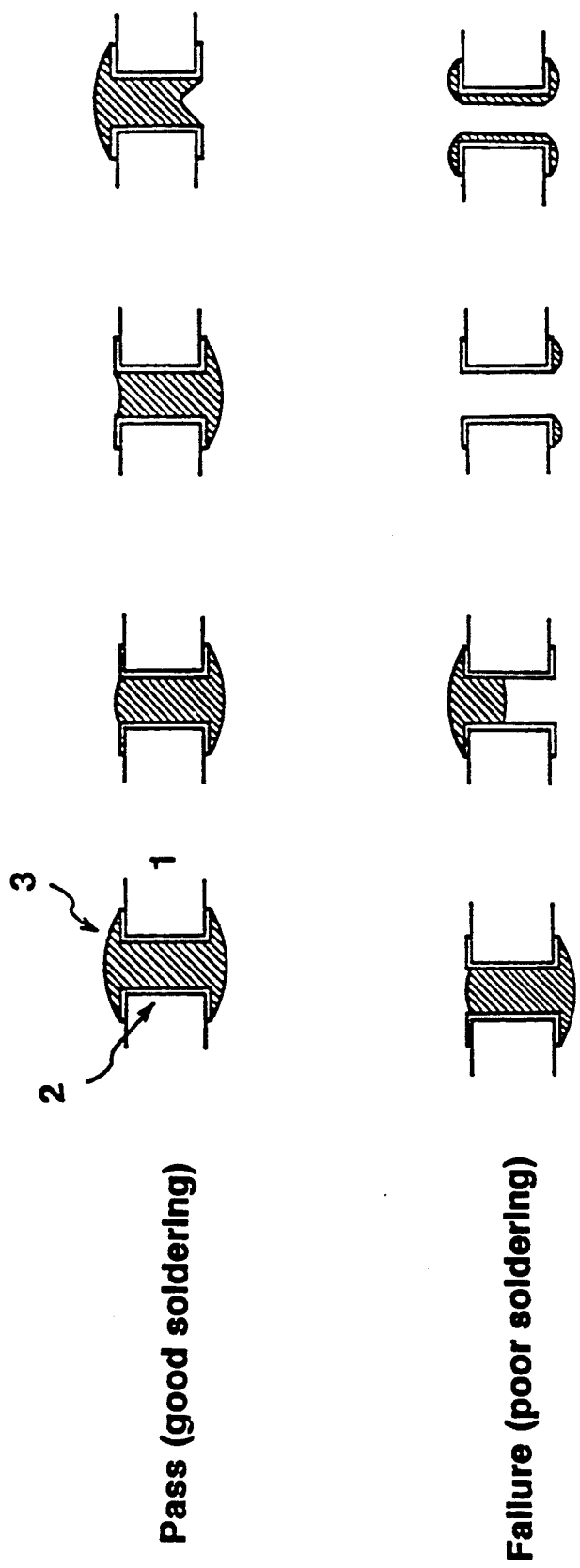
FIG. 1 shows the evaluation standard for the solderability of fluxes, in which the shapes in the upper row illustrate the good soldered ones and the shapes in the lower row illustrate the poor soldered ones.

In general, organic acids exhibit significantly poor flux activities compared with inorganic halogenated salts or hydrohalogenated amine salts. The relationships between the structure of organic acids and the capability of soldering is presumed as follows: as the molecular weight (carbon numbers) becomes smaller, the flux activities increases. But when it is applied in recent flow soldering equipment, organic acid of low molecular weight will substantially be evaporated during the preheating stage before soldering, thereby exhibiting almost no effective activities for soldering and resulting in only insufficient soldering. On the other hand, as the molecular weight becomes larger, the melting point or boiling point thereof becomes higher and thus can avoid the evaporation loss of the active ingredient of the flux during the preheating period. However, the problem lies in that the flux activities of those higher molecular weight ingredients are essentially low and the surplus of said higher molecular weight ingredients remains as an undesirable residue on the soldered surface.

In view of these facts, the problem can be solved by incorporating a large amount of one or more specific organic acids which possess a moderate flux activity and, at the same time, which will virtually evaporate at the soldering temperature. More precisely, by incorporating a certain amount of low-boiling point organic acid, a sufficient portion of the acid required for soldering will remain even after the preheating stage so that it can work successfully at the soldering stage.

As for an organic acid, an aliphatic primary carboxylic acid can be used, however, more preferred are a dibasic carboxylic acid such as malonic acid, succinic acid, glutaric acid, adipic acid, pimeric acid, suberic acid, azelaic acid or sebacic acid; or a hydroxy-carboxylic acid (oxy acid) such as glycolic acid, lactic acid, hydracrylic acid, hydroxybutylic acid, glyceric acid, tartronic acid, malic acid, tartaric acid or citric acid and the like; and a ketonic acid such as ketoglutaric acid, pyruvic acid, ketobutylic acid, levulinic acid and the like. One or more of those acids will be incorporated, singly or in combination of several kinds, into the soldering flux of this invention in an amount of from 0.1 to 20% by weight, preferably from 0.5 to 5% by weight, on the total composition.

Since organic acids are inherently poor both in flux activities and flowability, they are difficult to be replaced with the solder in the flow-soldering process and tend to prevent the solder from getting wet with the chipland or through-hole of the printed-circuit boards resulting in the incomplete soldering.

As a result of our extensive studies on the abovementioned problem, we have found that a further addition of one or more of phosphoric ester, phosphorous ester or hypophosphite ester, either individually or in combination, remarkably improves the solderability.

Since these phosphorous esters have a good mutual solubility with the organic acids, the addition of said esters improves the flowability of the acids, thereby promoting the capillary attraction of the acids to the through-hole of the printed-circuit boards or the replacement of the solder by the acids in the flow-soldering. In spite of the relatively low flux activity of the acids, the consistent action entailed by a great amount of acids involved therein can virtually assure the sufficient solderability.

The esters, i.e., one or more of phosphoric ester, phosphorous ester and hypophosphite ester, either individually or in combination, to be incorporated in the composition will be in an amount of from 0.01 to 10% by weight, preferably from 0.1 to 3% by weight, based on the total flux composition.

As for the solvent, isopropyl alcohol can chiefly be used, however, other common solvents such as methanol, ethanol, acetone, toluene, ethyl acetate, ethyl cellosolve or butyl cellosolve can be mixed in an appropriate amount as required.

Other additives, for example, anti-oxidants, plasticizers, thixo-modifiers, hydrohalogenated salts of amine or quarternary ammonium, and the like can optionally be incorporated into the composition.

The composition satisfying the above conditions can assure consistent solderability at a sufficient level with no corrosion or no decrease in the electric resistance since the composition will be almost dissipated, scattered or flowed away and leaves substantially no residue on the surface of the printed-circuit board after soldering when exposed to the heat in the flow-soldering or to the wave originated by the soldering.

Owing to these effects, the washing process by CFCs can be eliminated and it is advantageous for cost reduction as well as for alleviating the ozone layer destruction due to CFCs. Moreover, the fact that it leaves substantially no residue serves for improving the productivity significantly. Because the flux of this invention never occludes the direct contact of the pin-tip on the surface, it gives no problem for in-circuit testing, the most popular checking method for the detection of defective soldering.

Other features of the invention will become apparent in the course of the following description of the exemplary embodiments which are given for illustration of the invention and are not intended to be limiting thereof.

EXAMPLES

Comparative Examples 1-3 and Examples 1-2

The formulations of Comparative Examples 1-3 and Examples 1-2 set forth in Table 1 were prepared and evaluated according to the following test method and conditions using the test board specified below.

Test Method

The solderability on the through-holes of the test board (0.8 mm thick, 76.0×76.0 mm) were evaluated by soldering with a flow-solder.

Test Board 0.8 mm through-hole, 600 holes/piece

N = 10 (6,000 holes)

The test boards were prepared by printing a thermosetting solder resist on the surface excluding the part of cupper through-holes (25×24, total 600 holes) and through-hole lands of the glass-epoxy substrates (G-10, 1.6 mm thick).

Pretreatment Conditions for the Board

Each board was washed with acetone to remove fatty stains from the board surface, followed by etching with a mixed solution of sulfuric acid and aqueous hydroperoxide to eliminate the copper oxides from the surface. Then, the board was heated 90 minutes in a controlled atmosphere furnace at a temperature of 150° C. to give a uniform copper oxide layer on the surface.

Evaluation Standard for the solderability on the throughholes

FIG. 1 illustrates the typical shapes obtained by the flow-solder and shows the standard for pass and failure: the shapes in the upper row show the examples of good soldered ones and those in the lower row show failed ones, in which 1 designates a substrate and 2 is a through-hole to be filled with solder 3.

According to the aforementioned standard, each hole of the test boards (600/piece) were tested to determine whether it cleared the standard and the total percentage (ratio of pass holes/total holes) which passed the standard was taken as the evaluation score of each flux composition.

Conditions of soldering equipment

A single-wave flow solder with the following conditions was used.
1. Preheating: 130° C. ×60 sec.
2. Conveyer speed: 1 m/min.
3. Soldering temperature: 235° C.

The formulations of the soldering flux of the present invention (Examples 1-2) and those of conventional type (Comparative Examples 1-3) were given in Table 1, together with their test results.

Comparative Examples 1 and 2 showed relatively good solderability as 67% or 94% despite that the test boards were subjected to rather severe conditions. However, they entirely failed to comply with the in-circuit testing without prewashing for the defective soldering because a great amount of residue was remained on the surface. The residual ion concentration of Comparative Examples 1 and 2 was revealed to be so high as 90 and 150 μg NaCl/sq. inch, respectively. Comparative Example 3, which contained only acids proposed by this invention but not any phosphorous esters therein, could not accomplish the required solderability. Whereas, Examples 1 and 2 in which phosphorous esters were further formulated exhibited a remarkable improvement over the conventional rosin type in the solderability; i.e., solderability 100 %, even though they do not contain any halogens. The residual ion concentration of Examples 1 and 2 were as low as 13 and 9 μg NaCl/sq. in. and well satisfied the required level of 14 μg NaCl/sq. in. specified by the MIL standard.

TABLE 1

| Formulation (parts by weight) | | Solderability onto through-hole | Residual ion concentration (μg NaCl/sq. in.) | Appearance |
|---|---|---|---|---|
| Comparative Example 1 | | | | |
| WW rosin | 13 | 67% | 90 | A large amount of brownish rosin |

TABLE 1-continued

| Formulation (parts by weight) | | Solderability onto through-hole | Residual ion concentration (μg NaCl/sq. in.) | Appearance |
| --- | --- | --- | --- | --- |
| Diethylamine-HCl | 1 | | | residue was remained |
| Stearic acid | 1 | | | |
| Isopropyl alcohol | Balance | | | |
| Comparative Example 2 | | | | |
| Hydrogenated rosin | 13 | 94% | 115 | A large amount of pale colored |
| Cyclohexylamine-HCl | 1 | | | rosin was remained |
| Tetra-n-propylammonium bromide | 0.5 | | | |
| 2,3-Dibromo-1-propanol | 0.5 | | | |
| Isopropyl alcohol | Balance | | | |
| Comparative Example 3 | | | | |
| Valeric acid | 7 | 0% | 22 | A slight amount of white residue |
| Succinic acid | 1 | | | was observed on the substrate surface |
| Isopropyl alcohol | Balance | | | |
| Example 1 | | | | |
| Butyric acid | 7 | 100% | 13 | No residue was observed by the |
| Malic acid | 1 | | | naked eye |
| Tributyl phosphate | 2 | | | |
| Isopropyl alcohol | Balance | | | |
| Example 2 | | | | |
| Ketoglutaric acid | 7 | 100% | 9 | No residue was observed by the |
| Citric acid | 1 | | | naked eye |
| Dibutyl phosphite | 2 | | | |
| Isopropyl alcohol | Balance | | | |

The flux of this invention can significantly improve the solderability and, in addition, requires no washing process by CFCs and assures no problem in the in-circuit testing for detecting defective soldering since it leaves substantially no residue after soldering. Owing to these advantageous features, the flux of this invention can effectively comply with the CFCs regulation associated with the environmental problems and serves for reducing production cost and improving productivity.

Obviously, numerous modifications and variations of the present invention are possible in light of the above teachings. It is therefore to be understood that within the scope of the appended claims, the invention may be practiced otherwise than as specifically described herein.

What is claimed is:

1. A soldering flux composition which comprises at least one acid component selected from the group consisting of dibasic carboxylic acid, hydroxy-carboxylic acid and keto-carboxylic acid, and at least one ester component selected from the group consisting of phosphoric ester, phosphorous ester and hypophosphite ester.

2. The soldering flux composition according to claim 1, wherein the content of the acid component is in the range of from 0.1 to 20% by weight and the content of the ester component is in the range of from 0.01 to 10% by weight.

3. The soldering flux composition according to claim 1, wherein the content of the acid component is in the range of from 0.5 to 5% by weight and the content of the ester component is in the range of from 0.1 to 3% by weight.

* * * * *